(12) United States Patent
Vegter

(10) Patent No.: US 6,310,954 B1
(45) Date of Patent: Oct. 30, 2001

(54) RINGER CIRCUIT

(75) Inventor: Kor Vegter, Eemnes (NL)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/121,610

(22) Filed: Jul. 15, 1998

(51) Int. Cl.[7] ................................................ H04M 1/00
(52) U.S. Cl. ................................................ 379/418
(58) Field of Search .............................. 379/372–376, 379/387, 418

(56) References Cited

U.S. PATENT DOCUMENTS 4,599,494 * 7/1986 Welty .................................. 379/375

* cited by examiner

Primary Examiner—Wing F. Chan

(57) ABSTRACT

A high efficiency ringer circuit having low distortion of the ringer output signal, which is simple in design and inexpensive to manufacture is disclosed. This may be accomplished with a ringer circuit comprising an input signal source, a signal amplifier for receiving and amplifying an input signal from the input signal source, a direct current source for providing power to the signal amplifier, a comparator circuit for receiving an input signal from the signal amplifier, and a switching circuit for receiving an input signal from the comparator circuit for providing an output signal to the direct current source, where, when said input signal to the comparator circuit exceeds a set value, the output signal from the switching circuit de-energizes the direct current source. The amplifier may be a Push-Pull amplifier. The direct current power supply may be a DC/DC SMPS.

10 Claims, 2 Drawing Sheets

RINGER CIRCUIT

BACKGROUND OF THE INVENTION

1. Field of the Invention

The present invention relates to a ringer circuit, particularly to a ringer circuit utilizing an amplifier and comparator circuitry, and more particularly to a ringer circuit utilizing a Push-Pull amplifier and voltage comparators.

2. Description of the Related Art

A ringer circuit is usually utilized in telecommunications terminal equipment, such as telephones and facsimiles, to be activated from an input signal when an incoming call is received. When the ring signal is received at the input of the ringer circuit, the ringer circuit generates an output audio ringer signal, which is heard by the user.

Many conventional ringer circuits are known in the prior art, such as those disclosed in U.S. Pat. Nos. 5,526,418; 5,442,695; 5,111,499; 4,658,419; 4,653,093; and 4,327,254; the contents of which are hereby incorporated by reference herein. These conventional ringer circuits comprise a variety of analog and digital circuits.

However, these ringer circuits have the disadvantage that they often amplify distortion from the input signal in the output ringer signal and tend to be very inefficient. Prior attempts to rectify these disadvantages have resulted in ringer circuits which are complicated in design, and/or expensive to manufacture.

Accordingly, it is an object of the present invention to provide a ringer circuit having low distortion and high gain of the ringer output signal, while having a high efficiency. Moreover, it is still another object of the invention to provide a ringer circuit which is simple in design and inexpensive to manufacture.

Other important objects and advantages of the present invention will be apparent to those of skill in the art based upon the following disclosure, drawings, and claims.

SUMMARY OF THE INVENTION

The present invention relates to a high efficiency ringer circuit having low distortion of the ringer output signal, which is simple in design and inexpensive to manufacture. This may be accomplished with a ringer circuit comprising an input signal source, a signal amplifier for receiving and amplifying an input signal from the input signal source, a direct current source for providing power to the signal amplifier, a comparator circuit for receiving an input signal from the signal amplifier, and a switching circuit for receiving an input signal from the comparator circuit for providing an output signal to the direct current source, where, when said input signal to the comparator circuit exceeds a set value, the output signal from the switching circuit de-energizes the direct current source.

DETAILED DESCRIPTION

Figure 1:
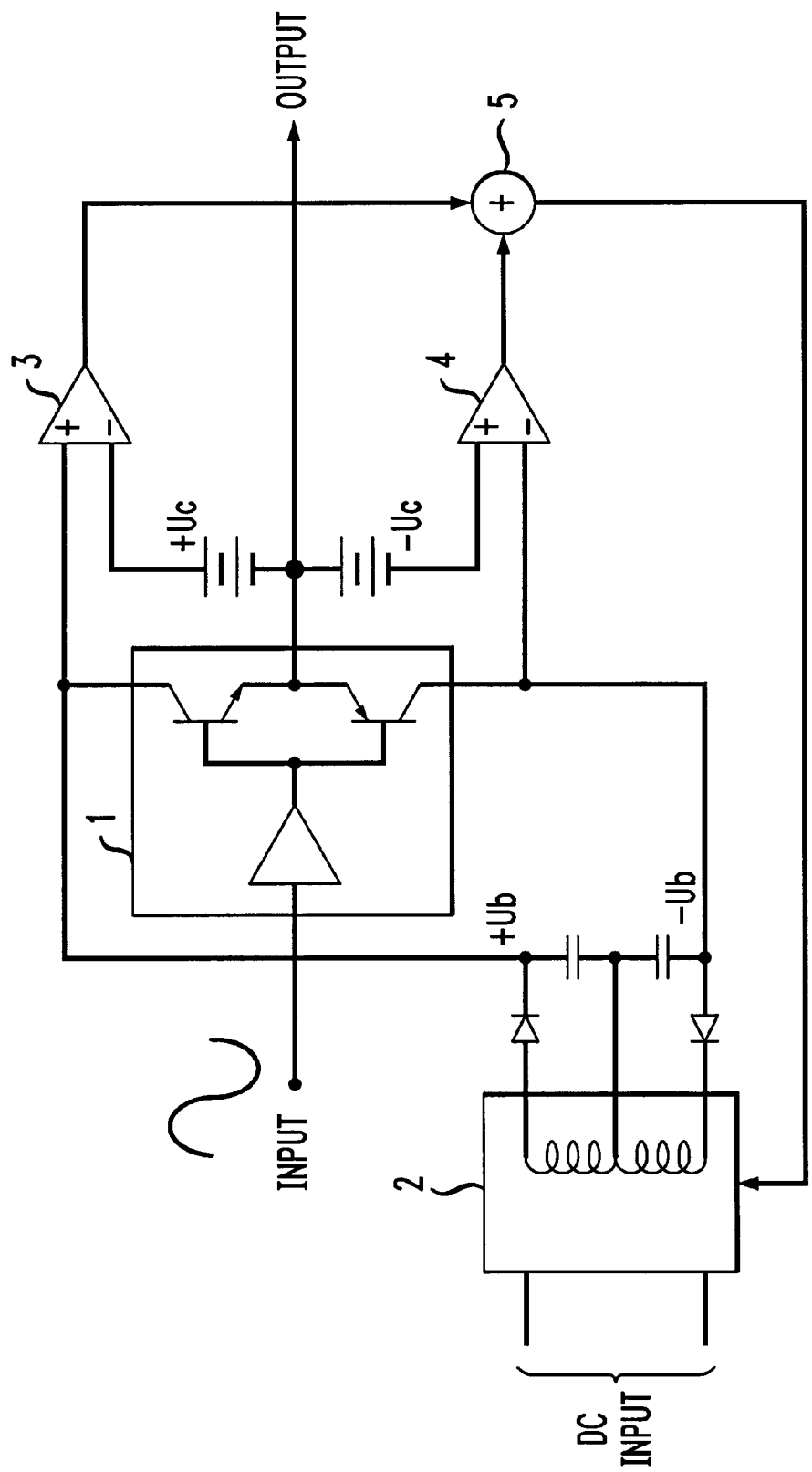
FIG. 1 is a circuit diagram illustrating a preferred embodiment of the present invention utilizing a Push-Pull amplifier and voltage comparators.

It will be appreciated that the following description is intended to refer to the specific embodiments of the invention selected for illustration in the drawings and is not intended to define or limit the invention, other than as in the appended claims.

FIG. 1 illustrates a preferred embodiment of the invention utilizing a signal amplifier and comparator circuit. Amplifier 1, which receives an input signal from an input signal source (not shown) is powered by Direct Current Source 2. In the embodiment shown in FIG. 1, Amplifier 1 is a Push-Pull amplifier, well known to those of ordinary skill in the art, and direct current power supply 2 is a DC/DC Single Mode Power Supply (SMPS). Of course, Amplifier 1 and Direct Current Source 2 may be any equivalent component capable of accomplishing the aspects of the present invention of described herein.

The output from the singal amplifier may then be inputted to a comparator circuit in the following manner. The positive output from Amplifier 1 is inputted to positive Voltage Comparator 3, which may comprise any number of voltage comparison circuits, such as an operational amplifier and associated circuitry, well known to those of ordinary skill in the art. The negative output from Amplifier 1 is inputted to negative Voltage Comparator 4 in a manner similar to that of Voltage Comparator 3.

Each of the outputs from Voltage Comparators 3 and 4 are, in turn, inputted to Switching Circuit 5, which is represented in FIG. 1 by a logical AND circuit. The output of Switching Circuit 5 is connected to Direct Current Source 2. Direct Current Source 2 provides voltages +Ub and −Ub to Amplifier 2 in a conventional manner. Comparison voltages, +Uc and −Uc, are inputted to Voltage Comparators 3 and 4, respectively, for comparison with the positive and negative outputs signals from Amplifier 1, respectively. Voltage Comparators 3 and 4 are powered in a conventional manner by one or more additional power sources (not shown).

Operation of the circuit of the preferred embodiment of the present invention shown in FIG. 1 will now be described.

An input signal, such as sinusoid or any other related signal, is inputted to Amplifier 1, here a Push-Pull amplifier. Power from Direct Current Source 2 is used by Amplifier 1 to generate positive and negative output signals at the +inputs of Voltage Comparators 3 and 4. Depending on the shutdown needed for Direct Current Source 2 from Switching Circuit 5, the actual value of Ub can be 0v to greater than the peak value of the desired ringer output voltage.

High efficiency and low amplifier distortion in the ringer output signal can be achieved by controlling the powering of Amplifier 1 by Direct Current Source 2 through the use of Switching Circuit 5 and Voltage Comparators 3 and 4. Voltage Comparators 3 and 4 measure the transistors in the Push-Pull amplifier of Amplifier 1. When the input voltages to the voltage comparators from Amplifier 1 exceeds Uc, the input values at the logical AND circuit of Switching Circuit 5 are equal and Switching Circuit 5 shuts down DC/DC Converter of Direct Current Source 2, de-energizing it, and removing power from Amplifier 1.

Thus, the powering of Amplifier 1 follows the ringer output signal with a difference of at least Uc. The value of Uc is approximately the maximum ripple voltage plus saturation voltage of the Push-Pull transistors. A preferable value of this voltage is 8v, although the invention is certainly not limited thereto.

Because Uc is very low as compared to Ub, the dissipation of Amplifier 1 is also very low. This results in a significantly improved efficiency for Amplifier 1. When a DC/DC converter is utilized in Direct Current Source 2, an overall efficiency of >70% can be achieved. Additionally, the output ringer voltage is an amplified input voltage with the same distortion level as the input signal. Thus, the contribution of the amplifier to the output distortion is minimal, typically less than 1%.

Figure 2:
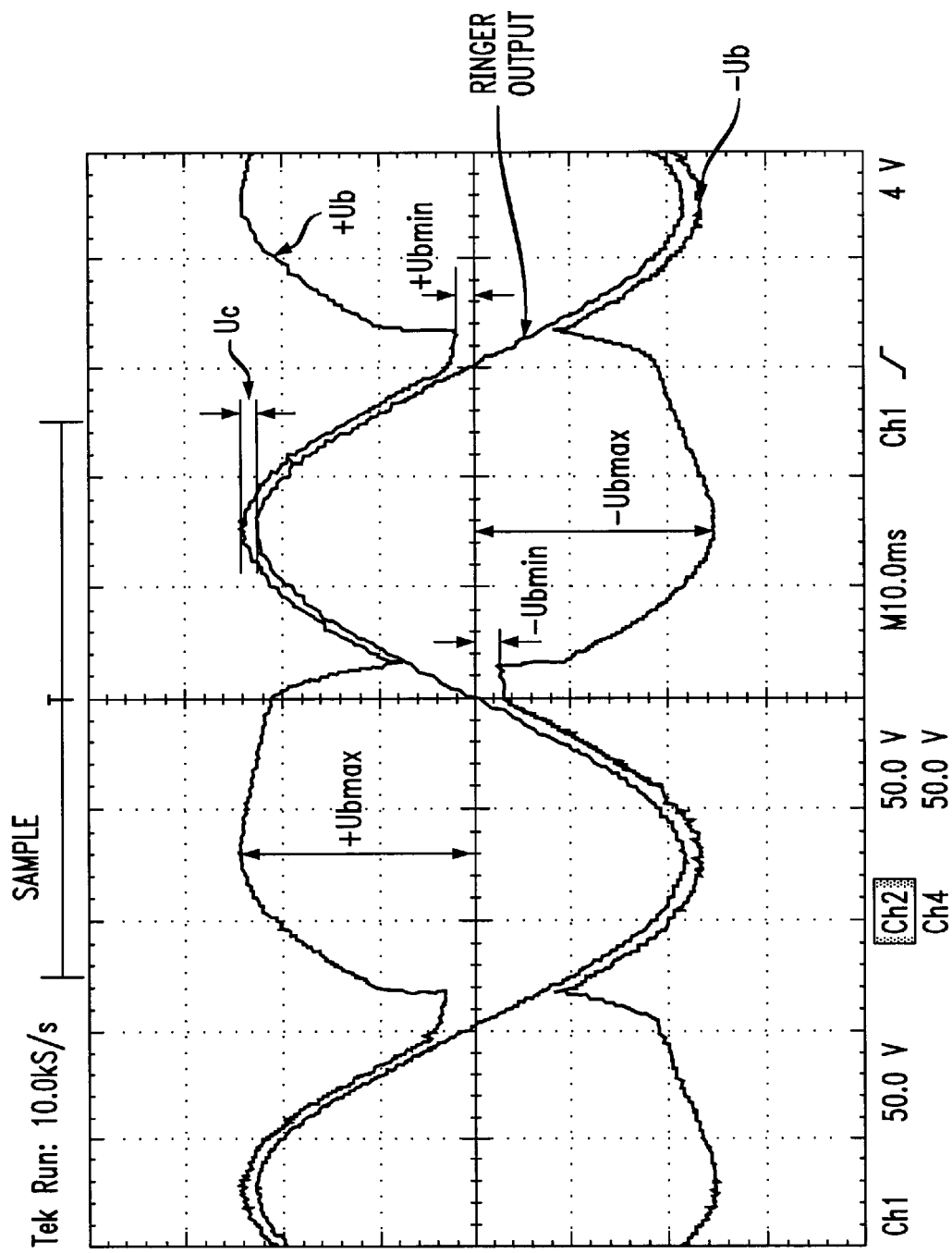
FIG. 2 is a graph illustrating a ringer output signal from a preferred embodiment of the present invention.

The ringer circuit shown in FIG. 1 achieved an output voltage of 79v effective (112v top) with a load of 5W. The output from this circuit is shown in FIG. 2. The voltages +Ub and −Ub can be varied between about 0 to 150v and in the Example shown in FIG. 2, had a maximum of 125v. The value used for Uc was 8v. The input signal was a sine wave from a PWM output from a microprocessor. The output signal shown in FIG. 2 was loaded with 1200 ohms and achieved an efficiency of about 70%.

Although this invention has described in connection with specific forms thereof, it will be appreciated that a wide variety of equivalents may be substituted for the specific elements described herein without departing from the spirit and scope of the invention as described in the appended claims. For example, a variety of amplifier, comparator, and switching circuits may be used which allow for the powering of the amplifier to follow the output signal, such as through the use of commonly available standard integrated circuit chips, application specific chips and the like. The direct current source is preferably a DC/DC/ SMPS, but may be any DC power converter or source capable of be energized and de-energized in the manner of the claimed invention.

What is claimed is:

1. A ringer circuit comprising:
   an input signal source;
   a signal amplifier connected to said input signal source for receiving and amplifying an input signal from said input signal source;
   a direct current source connected to said signal amplifier for providing power thereto;
   a comparator circuit connected to said signal amplifier for receiving an input signal therefrom; and
   a switching circuit connected to said comparator circuit for receiving an input signal therefrom and to said direct current source for providing an output signal thereto,
   wherein when said input signal to said comparator circuit exceeds a set value, said output signal from said switching circuit de-energizes said direct current source.

2. The ringer circuit of claim 1 wherein said amplifier is a Push-Pull amplifier.

3. The ringer circuit of claim 2 wherein said comparator circuit comprises a positive voltage comparator for receiving a positive input signal from said Push-Pull amplifier and a negative voltage comparator for receiving a negative input signal from said Push-Pull amplifier.

4. The ringer circuit of claim 1 wherein said direct current source comprises DC/DC converter.

5. The ringer circuit of claim 1 wherein said switching circuit comprises a logical AND circuit.

6. A ringer circuit comprising:
   an input signal source,
   a Push-Pull signal amplifier connected to said input signal source for receiving and amplifying an input signal from said input signal source;
   a direct current source connected to said Push-Pull signal amplifier for providing power thereto;
   a positive voltage comparator circuit connected to said Push-Pull signal amplifier for receiving a positive input signal therefrom;
   a negative voltage comparator circuit connected to said Push-Pull signal amplifier for receiving a negative input signal therefrom; and
   a switching circuit having one input connected to said positive voltage comparator circuit for receiving an input signal therefrom and another input connected to said negative voltage comparator circuit for receiving an input signal therefrom,
   wherein said switching circuit de-energizes said direct current source if said input signal to said positive voltage comparator and said input signal to said negative voltage comparator exceed at least one set value.

7. The ringer circuit of claim 6 wherein said direct current source comprises DC/DC converter.

8. The ringer circuit of claim 6 wherein said switching circuit comprises a logical AND circuit.

9. A ringer circuit comprising:
   an input signal source,
   a Push-Pull signal amplifier connected to said input signal source for receiving and amplifying an input signal from said input signal source;
   a direct current source connected to said Push-Pull signal amplifier for providing power thereto;
   a positive voltage comparator circuit connected to said Push-pull signal amplifier for receiving a positive input signal therefrom;
   a negative voltage comparator circuit connected to said Push-Pull signal amplifier for receiving a negative input signal therefrom; and
   a logical AND circuit having one input connected to said positive voltage comparator circuit for receiving an input signal therefrom and another input connected to said negative voltage comparator circuit for receiving an input signal therefrom,
   wherein said logical AND circuit de-energizes said direct current source if said input signal from said positive voltage comparator and said input signal to from negative voltage comparator are the same.

10. The ringer circuit of claim 6 wherein said direct current source comprises DC/DC converter.

* * * * *